United States Patent
Fukumitsu

(10) Patent No.: US 8,295,715 B2
(45) Date of Patent: Oct. 23, 2012

(54) OPTICAL RECEIVER AND OPTICAL PHASE CONTROL METHOD THEREOF

(75) Inventor: Katsumi Fukumitsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 817 days.

(21) Appl. No.: 12/318,585

(22) Filed: Dec. 31, 2008

(65) Prior Publication Data

US 2009/0257756 A1 Oct. 15, 2009

(30) Foreign Application Priority Data

Apr. 14, 2008 (JP) ................. 2008-104711

(51) Int. Cl.
H04B 10/06 (2006.01)
(52) U.S. Cl. .............. 398/212; 398/204; 398/205
(58) Field of Classification Search .......... 398/202–214
See application file for complete search history.

(56) References Cited

U.S. PATENT DOCUMENTS

| | | | |
|---|---|---|---|
| 2006/0193639 A1 | 8/2006 | Liu et al. | |
| 2006/0245763 A1 | 11/2006 | Ishida et al. | |
| 2007/0122159 A1* | 5/2007 | Dalton | 398/155 |
| 2007/0177151 A1* | 8/2007 | Isomura et al. | 356/477 |
| 2008/0056733 A1* | 3/2008 | Isomura et al. | 398/209 |
| 2008/0069571 A1 | 3/2008 | Honda | |
| 2008/0253761 A1* | 10/2008 | Mizuguchi et al. | 398/17 |
| 2009/0034967 A1* | 2/2009 | Tao et al. | 398/33 |

FOREIGN PATENT DOCUMENTS

| | | |
|---|---|---|
| JP | 9-46303 | 2/1997 |
| JP | 2006-246471 | 9/2006 |
| JP | 2007-020138 | 1/2007 |
| JP | 2008-72555 | 3/2008 |
| WO | WO 2005/025094 | 3/2005 |
| WO | WO 2007/007864 | 1/2007 |

OTHER PUBLICATIONS

Japanese Patent Office Action dated Apr. 17, 2012 in Application No. 2008-104711.

* cited by examiner

*Primary Examiner* — Dzung Tran
(74) *Attorney, Agent, or Firm* — Staas & Halsey LLP

(57) ABSTRACT

An optical receiver includes: delay interferometers respectively provided in at least two branches that branch a reception signal; a phase shift amount control device that controls a phase shift amount of the delay interferometer in accordance with an optical phase control value; a balanced optical detecting section that respectively photoelectrically converts respective branch signals output from the delay interferometers; a data regenerating section that regenerates transmission data from the photoelectrically converted branch signals output from the balanced optical detecting section; a control section that outputs the optical phase control value based on a signal of the data regenerating section; and a memory that stores therein the optical phase control value output from the control section at the time of signal communication, as a history of control values, wherein the control section refers to the history of control values during a signal communication operation to determine the optical phase control value.

24 Claims, 11 Drawing Sheets

FG 11
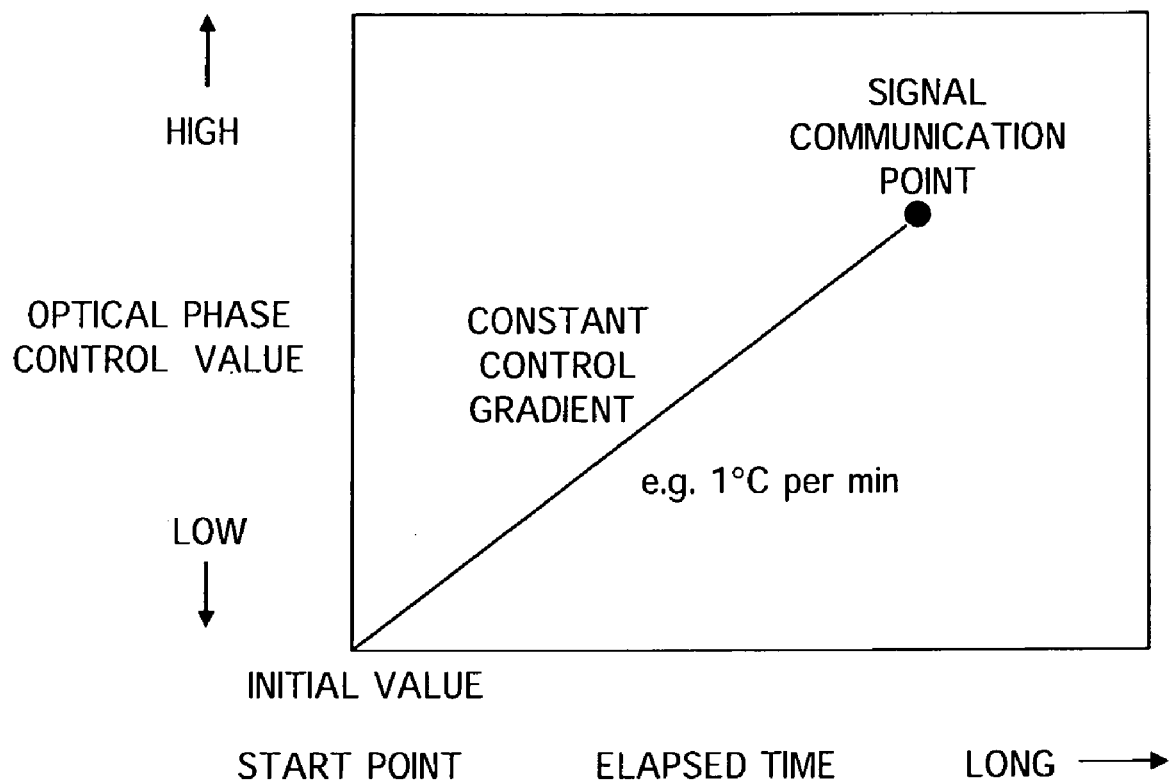

OPTICAL RECEIVER AND OPTICAL PHASE CONTROL METHOD THEREOF

CROSS-REFERENCE TO RELATED APPLICATION

This application is based upon and claims the benefit of priority of the prior Japanese Patent Application No. 2008-104711, filed on Apr. 14, 2008, the entire contents of which are incorporated herein by reference.

FIELD

The present invention relates to an optical phase control technique applied to an optical receiver of a phase modulation type used in optical communication.

BACKGROUND

In optical communication systems, the transmission speed of backbone optical transmission lines is advancing from 10 Gb/s to 40 Gb/s, accompanying the recent rapid increase in transmission capacity. In order to realize transmission speeds of 40 Gb/s, various types of optical modulation systems are proposed, and amongst these, a differential phase shift keying (DPSK) or a differential quadrature phase shift keying (DQPSK) serving as optical phase modulated systems are considered as most likely. In particular, because the DQPSK comparatively alleviates the demand for high speed in electrical devices, the adjustment of optical dispersion, and polarization mode dispersion, the DQPSK has become a strong candidate for optical modulation systems.

A configuration example of an optical communication system of such a DQPSK optical modulation system is shown in FIG. 5 though FIG. 7. FIG. 5 shows a configuration example of a point-to-point system which does not have a redundant system, while FIG. 6 shows a configuration example of a point-to-point system which is provided with a redundant system for improving reliability. Furthermore, FIG. 7 shows a configuration example of an optical unidirectional path switched ring (OUPSR) system combined with a reconfigurable optical add-drop multiplexer (ROADM) in consideration of application to a ring network.

In these optical communication systems, transponder devices TP are used, that inputs therein an STM 256/OC768 (40 Gb/s) signal, as a client signal, and convert this signal into an optical transport network (OTN) frame format, and transmit an OTU 3 (43 Gb/s) signal to a backbone optical transmission line. Also, the transponder devices TP receive the OTU 3 (43 Gb/s) signal from the backbone optical transmission line and subject this signal to inverse transformation of the OTN frame format, and output the client signal, as the STM 256/OC768 (40 Gb/s) signal. A configuration example of these transponder devices TP is shown in FIG. 8. FIG. 8A shows an example of a transponder device TP used in the system that does not have a redundant system shown in FIG. 5, while FIG. 8B shows an example of a transponder device TP used in the system provided with a redundant system shown in FIG. 6 and FIG. 7.

The transponder device TP includes: a very short reach (VSR) module 1 (40 G) which is an interface on the client side; a narrow band (NB) module 2 (43 G) that is an interface on the backbone optical transmission line (network) side; and an OTN framer 3 (40 G) that converts an output signal of the VSR module 1 into a signal of OTN frame format and inputs this converted signal to the NB module 2, and conversely inverse transforms a signal of OTN frame format output from the NB module 2, and inputs this inverse transformed signal to the VSR module 1. Furthermore, as shown in FIG. 8B, in the transponder device TP for the optical transmission line provided with a redundant system, there is provided an optical coupler 4 and an optical switch 5 between the NB module 2 and the plurality of optical transmission lines. The optical coupler 4 branches the OTU 3 signal output from the NB module 2 and transmits these branched signals to both of the active/standby optical transmission lines, respectively. The optical switch 5 selects one of the OTU 3 signals received from both of the active/standby optical transmission lines, and outputs this selected signal to the NB module 2.

FIG. 9 shows details of the NB module 2. The inside of the NB module 2 can be largely divided into two parts, namely an optical transmitter 10 and an optical receiver 20.

In the optical transmitter 10, a 16:1 serializer 11 multiplexes the sixteen 2.69 Gb/s signals input in parallel from the OTN framer 3 to make a signal of 43 Gb/s, and then a 1:2 demultiplexer 12 separates this output signal from the 16:1 serializer 11 into two 21.5 Gb/s data signals and one 21.5 GHz clock signal. The respective data signals are input to drivers 13a and 13b of a DQPSK LN module (LiNbO3 module) 13, and the clock signal is input to a driver 14a of a return to zero (RZ) LN module 14. An output light of a tunable laser diode (LD) 15 serving as a variable length laser, is phase modulated in accordance with the 21.5 Gb/s data signals in the LN module 13, and then intensity modulated in accordance with the 21.5 GHz clock signal in the LN module 14, so that an OTU 3 signal of the RZ-DQPSK modulation type is transmitted to the optical transmission line.

In the optical receiver 20, a delay interference section 21 receives the RZ-DQPSK type OTU 3 signal from the optical transmission line. In the delay interference section 21, the received signal is branched into two branches, namely an A branch (I or Q) and a B branch (Q or I), and for each, optical phase adjustment of the branch signal is executed. After this, the respective branch signals are subjected to balanced detection in a balanced optical detecting section 22 provided with two twin photodiodes, and current/voltage conversion and the like is executed in a trans-impedance amplifier and a limiting amplifier within a data regenerating section 23. The respective reception signals of 21.5 Gb/s output from the data regenerating section 23 are multiplexed in a 2:1 multiplexer 24, and the 43 Gb/s signal due to the multiplexing is separated into sixteen 2.69 Gb/s data signals, by a 1:16 deserializer 25. The 2:1 multiplexer 24 at this time is operated in accordance with a 21.5 GHz clock signal from a clock recovery circuit 26 that regenerates clock signal contained in the reception signal.

A detailed configuration example of the optical receiver 20 is shown in FIG. 10. The optical receiver 20 of this conventional example is disclosed for example in Japanese Unexamined Patent Publication No. 2007-020138 (in particular refer to FIG. 5).

The delay interference section 21 is provided with an A branch and a B branch, and in each of these branches is arranged for example delay interferometers 21a and 21b that use Mach-Zehnder interferometers, and heaters 21c and 21d serving as temperature control devices for the delay interferometers 21a and 21b. The phase shift amount of the delay interferometers 21a and 21b is changed corresponding to temperature change, and for example, the delay interferometers 21a and 21b have a characteristic where the phase shift amount increases with a rise in temperature. However they are not limited to this, and a device that adjusts the phase shift amount using a voltage change or the like is also suitable. The heaters 21c and 21d function as phase shift amount control devices that control the phase shift amount of the delay interferometers 21a and the 21b in accordance with an optical phase control value. A Peltier element 21e is provided as an ambient temperature control device for maintaining the ambient temperature of the delay interferometers 21a and 21b at a predetermined temperature. In the case where it is possible to control the phase shift amount of the delay interferometers 21a and 21b to a target value without the Peltier element 21e, the ambient temperature control element such as the Peltier element 21e can be omitted. These heaters 21c and 21d, and the Peltier element 21e are controlled by a temperature controller 21f provided with a thermometer for measuring the ambient temperature, and a DA converter (DAC), in accordance with a central processing unit (CPU) 30 serving as a control section.

As described above, in the case of the optical receiver that adjusts the optical phase with the temperature control information of the delay interferometer as the optical phase control value, there is a problem in an operation permitting a signal to be communicated (i.e., signal communication operation) in the not yet signal communicated state, for example, the operation performed when transmitting initial signal at system start-up or recovering after occurrence of signal interruption in the optical transmission line. The problem is that several minutes to several tens of minutes is required until the signal is actually communicated in the operation. That is to say, as shown in FIG. 11, in the optical phase control method in the above described optical receiver, when the signal communication operation is performed, the optical phase control is executed that starts control from the initial value (temperature minimum value) of the optical phase control value, and raises the optical phase control value at a constant control gradient of for example 1° C. per minute, and searches for the signal communication point. Therefore, in order to raise a temperature of the heater to a temperature to set the phase shift amount of the delay interferometer that communicates the signal, several minutes to several tens of minutes is required.

Also, in the optical communication system provided with a plurality of optical transmission lines serving as the redundant system, as shown in FIG. 6 or FIG. 7, the above-mentioned delay of the optical phase control might occur in the case of performing switching from the active optical transmission line to the standby optical transmission line. That is to say, since there are not many situations where the length of the optical transmission lines for active and standby are the same, then when the optical transmission line is switched, optical phase adjustment in the optical receiver must be performed. Also when switching the optical transmission lines, in the conventional optical phase control method, control starts from the initial value of the optical phase control value. Therefore a discrepancy the same as at the time of the aforementioned signal communication operation arises.

SUMMARY

In consideration of the above problem, the present invention provides an optical phase control technique for an optical receiver that searches for an optical signal communication point in a shorter time than heretofore.

In order to resolve this problem, herein, there is proposed an optical phase control method performed in an optical receiver that branches a signal received from an optical transmission line into at least two branches, and changes a phase shift amount of a delay interferometer provided in each branch, to thereby perform optical phase adjustment of each branched signal, the optical phase control method includes: storing an optical phase control value for changing the phase shift amount of the delay interferometer in each case of signal communication, as a history of control values; and determining the optical phase control value with reference to the history of control values during a signal communication operation.

Furthermore, there is provided an aspect of an optical receiver for executing this optical phase control method, which is used in an optical communication system, wherein the optical receiver includes: delay interferometers respectively provided in at least two branches that branch a reception signal; a phase shift amount control device that controls a phase shift amount of the delay interferometer in accordance with an optical phase control value; a balanced optical detecting section that respectively photoelectrically converts respective branch signals output from the delay interferometers; a data regenerating section that regenerates transmission data from the photoelectrically converted branch signals that are output from the balanced optical detecting section; a control section that outputs the optical phase control value based on a signal of the data regenerating section; and a memory that stores therein the optical phase control value output from the control section at the time of signal communication, as a history of control values, wherein the control section refers to the history of control values during a signal communication operation to determine the optical phase control value.

Furthermore, in order to resolve the above problem, there is provided an optical phase control method performed in an optical receiver that branches a signal that is transmitted through any of a plurality of optical transmission lines provided as redundant systems, into at least two branches, and changes a phase shift amount of a delay interferometer provided in each branch, to thereby perform optical phase adjustment of each branch signal, the optical phase control method includes: storing an optical phase control value for changing the phase shift amount of the delay interferometer in each case of signal communication, regarding each of the plurality of optical transmission lines, as a history of control values for each of the optical transmission lines; and determining the optical phase control value with reference to the history of control values of the optical transmission line switched to be used, during a switching operation of the optical transmission lines.

Moreover, there is provided an aspect of an optical receiver for executing this optical phase control method, which is used in an optical communication system in which a plurality of optical transmission lines serving as redundant systems are switchably provided, wherein the optical receiver includes: delay interferometers respectively provided in at least two branches that branch a reception signal; a phase shift amount control device that controls a phase shift amount of the delay interferometers in accordance with an optical phase control value; a balanced optical detecting section that respectively photoelectrically converts respective branch signals output from the delay interferometers; a data regenerating section that regenerates transmission data from the photoelectrically converted branch signals that are output from the balanced optical detecting section; a control section that outputs the optical phase control value based on a signal of the data regenerating section; and a memory that stores therein the optical phase control value output from the control section at the time of signal communication, in association with the optical transmission line which is used at the time of the signal communication, as a history of control values for each of the optical transmission lines, wherein the control section refers to the history of control values of the optical transmission line switched to be used, to determine the optical phase control value, during a switching operation of the optical transmission lines.

Additional objects and advantage of the invention will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 11 is a diagram for explaining an optical phase control method of a related technology.

DESCRIPTION OF EMBODIMENTS

Figure 1:
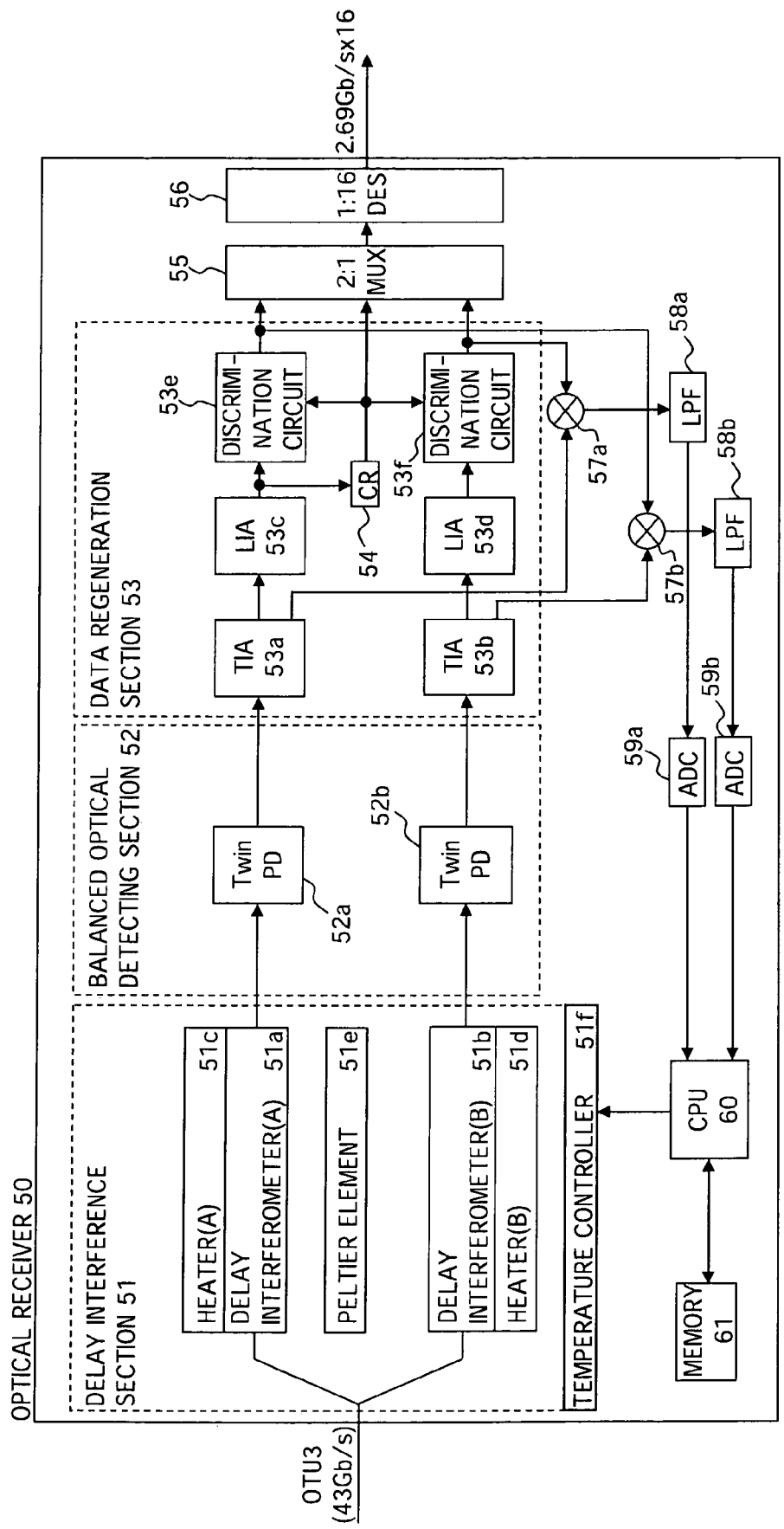
FIG. 1 is a block diagram showing an embodiment of an optical receiver.
Figure 8A:
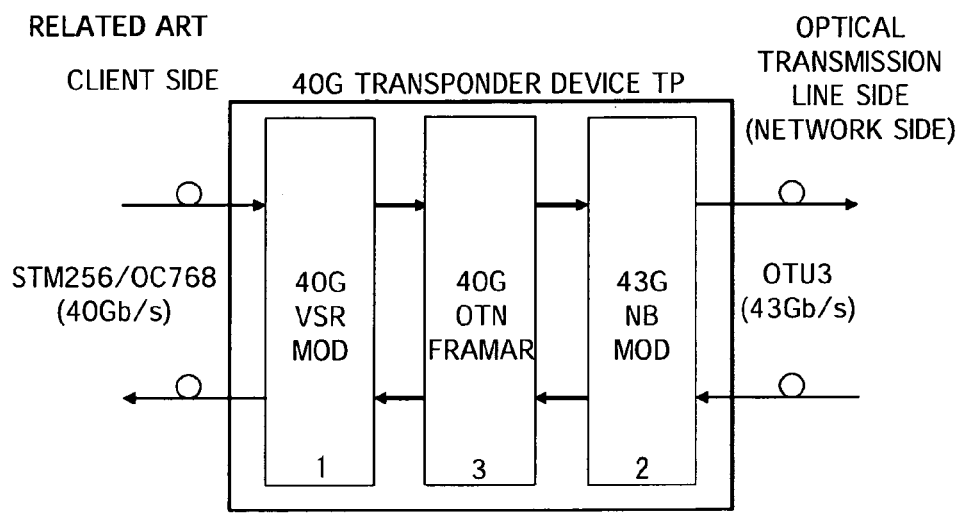
FIG. 8 (A) is a block diagram of a transponder device used in the optical communication system of FIG. 5, and FIG. 8 (B) is a block diagram of a transponder device used in the optical communication system of FIG. 6 and FIG. 7.

FIG. 1 is a block diagram showing an embodiment of an optical receiver. This optical receiver 50 is used in the NB module 2 (FIG. 9) of the transponder device TP shown in FIG. 8.

In the optical receiver 50, a delay interference section 51 receives for example a RZ-DQPSK type OTU 3 signal (43 Gb/s) applied from an optical transmission line. In the delay interference section 51, the received signal is branched into two branches, namely an A branch (I or Q) and a B branch (Q or I), and in each of the branches, optical phase adjustment of the branched signals is executed. Here as a modulation type for the received signal, an example of a RZ-DQPSK is described. However the modulation type is not limited to this, for example, a multi-valued phase modulation method that performs reception processing using a delay interferometer, or in a modulation type in which intensity modulation is combined in the phase modulation, are also considered. Furthermore, the transmission speed of the reception signal is not limited to 43 Gb/s.

In each of the A branch and the B branch in the delay interference section 51, there is arranged for example delay interferometers 51a and 51b that use Mach-Zehnder interferometers, and heaters 51c and 51d serving as temperature control devices for the delay interferometers 51a and 51b. The phase shift amount (change amount of the phase) of the delay interferometers 51a and 51b is changed corresponding to temperature change, and for example, the delay interferometers 51a and 51b have a characteristic where the phase shift amount increases with a rise in temperature. However, they are not limited to this, and a device that adjusts the phase shift amount using a voltage change or the like can also be used according to circumstances. The heaters 51c and 51d function as phase shift amount control devices that control the phase shift amount of the delay interferometers 51a and 51b in accordance with an optical phase control value. A Peltier element 51e is provided as an ambient temperature control device for maintaining the ambient temperature of the delay interferometers 51a and 51b at a predetermined temperature. In the case where it is possible to control the phase shift amount of the delay interferometers 51a and 51b to a target value without the Peltier element 51e, the ambient temperature control element such as the Peltier element 51e may be omitted. These heaters 51c and 51d and the Peltier element 51e are controlled by a temperature controller 51f provided with a thermometer and a DA converter, in accordance with a CPU 60 serving as a control section.

The respective branch signals that have passed through the delay interferometers 51a and 51b are subjected to balanced detection in a balanced optical detecting section 52 provided with two twin photodiodes (PD) 52a and 52b. Then current/voltage conversion is executed in trans-impedance amplifiers (TIA) 53a and 53b and in limiting amplifiers (LIA) 53c and 53d within a data regeneration section 53. The branch signals output from the limiting amplifiers 53c and 53d are input to discrimination circuits 53e and 53f, and a 21.5 GHz clock signal that has been regenerated by a clock recovery circuit (CR) 54 is used to perform logical judgement, and the transmission data is regenerated. The clock recovery circuit 54 that regenerates the clock signal contained in the reception signal, in the case of this example, regenerates a clock signal from an output signal of the limiting amplifier 53c of the A branch. This clock recovery circuit 54 is provided with a phase locked loop (PLL), and when the phase locked loop is locked, the clock recovery is complete.

The respective data signals of 21.5 Gb/s output from the discrimination circuits 53e and 53f are multiplexed in a 2:1 multiplexer (MUX) 55 that operates in accordance with the 21.5 GHz clock signal from the clock recovery circuit 54. The 43 Gb/s signal due to multiplexing is separated into sixteen 2.69 Gb/s signals by a 1:16 deserializer (DES) 56.

In this embodiment, the output signal of the trans-impedance amplifier 53a of the A branch, and the output signal of the discrimination circuit 53f of the B branch are mixed in a mixer 57a. Furthermore, the output signal of the trans-impedance amplifier 53b of the B branch and the output signal of the discrimination circuits 53e of the A branch are mixed in a mixer 57b. The outputs from the respective mixers 57a and 57b are digitally converted in AD converters (ADC) 59a and 59b through low pass filters (LPF) 58a and 58b, and input to the CPU 60. Based on this input information, the CPU 60 outputs optical phase control values, and the heaters 51c and 51d are controlled by the temperature controller 51f on the basis of the optical phase control values (details are disclosed in detail in the abovementioned Japanese Unexamined Patent Publication No. 2007-020138).

The CPU 60 is provided with a memory 61 that stores the optical phase control value that the CPU 60 outputs at the time of signal communication, and in the memory 61, the history of control values is memorized. A storage device such as a rewritable nonvolatile semiconductor memory or a HDD can be used as the memory 61.

Figure 5:
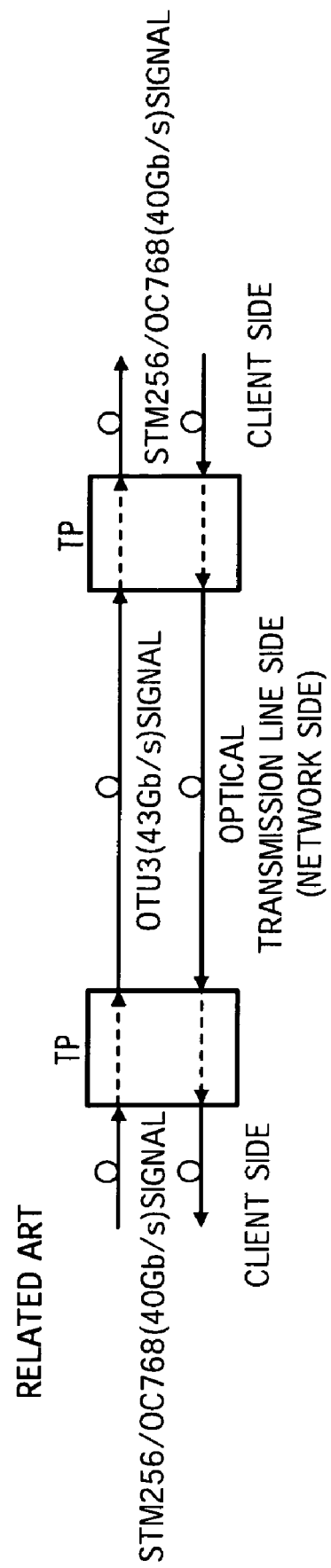
FIG. 5 is a diagram showing a configuration example of a point-to-point optical communication system that does not have a redundant system.
Figure 6:
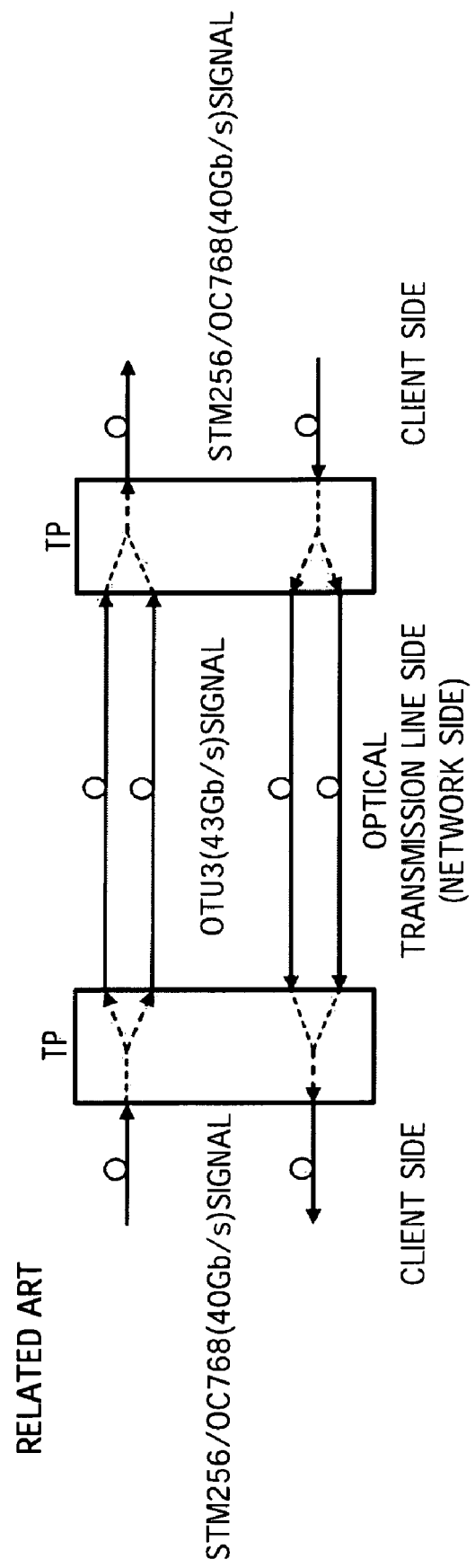
FIG. 6 is a diagram showing a configuration example of a point-to-point optical communication system that has a redundant system.
Figure 7:
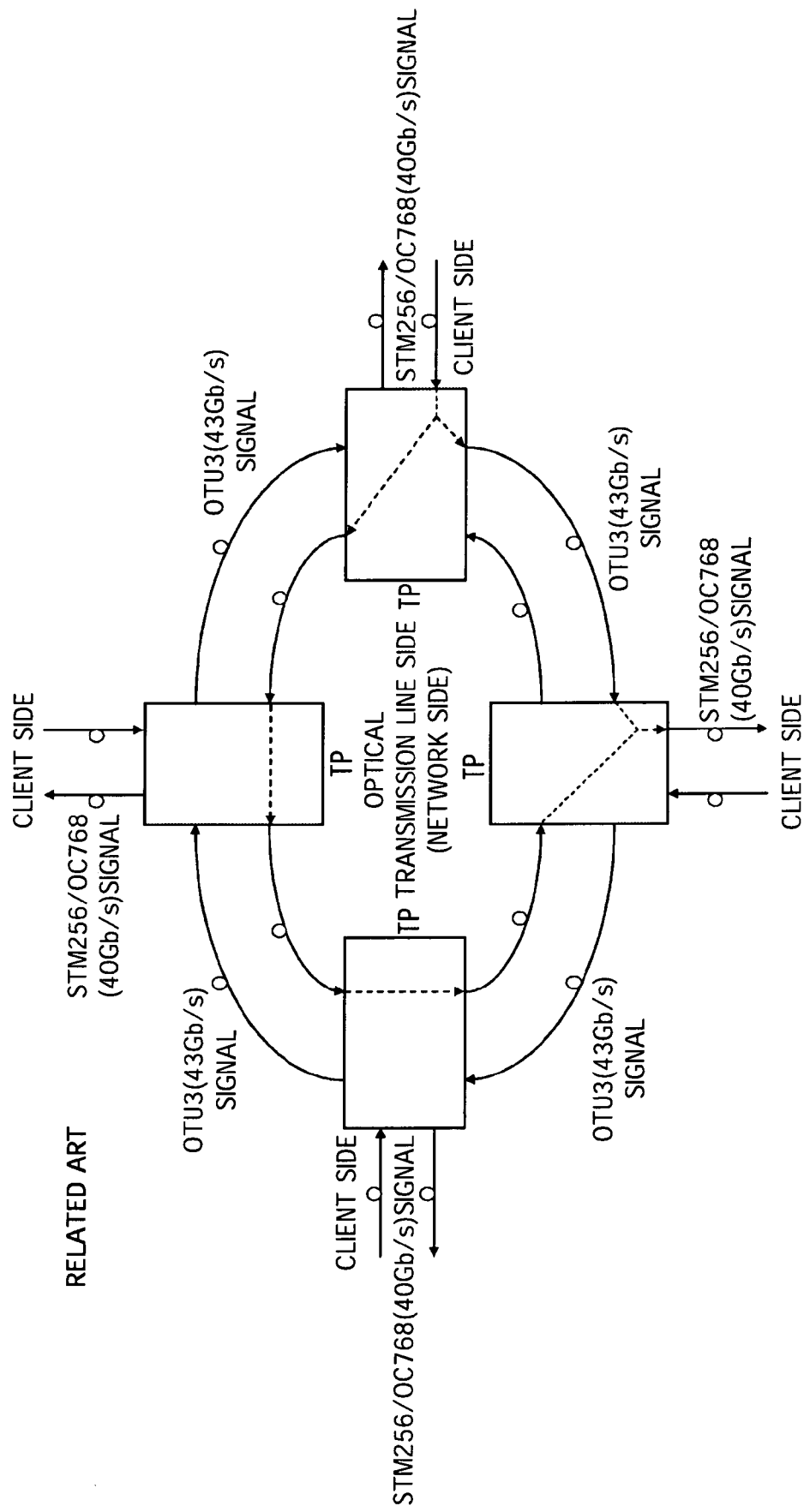
FIG. 7 is a diagram showing a configuration example of an optical communication system serving as a ring network.

A signal communication operation executed in the optical communication system as shown in FIG. 5 through FIG. 7 is described. In this embodiment, the transponder devices TP of the optical communication system have the above-mentioned receiver 50 provided in the NB module 2, and are connected by an optical transmission line.

At first, at initial system start-up, the CPU 60, as shown in FIG. 11, starts the signal communication operation from the initial value (lowest temperature value) of the optical phase control value that is a default setting, and raises the optical phase control value at a constant control gradient of for example 1° C. per minute, and searches for a signal communication point. The CPU 60 at this time judges the time where the clock recovery circuit 54 is locked as a signal communication, and stores the optical phase control value output at the time of this signal communication judgement in the memory 61. This value becomes the first time (oldest) optical phase control value of the history of control values.

The CPU 60 after this, when a signal interruption is detected by the balanced optical detecting section 52, and it is confirmed that a signal is input to the balanced optical detecting section 52 in the subsequent restoration, refers to the history of control values stored in the memory 61. Then, if this signal interruption recovery occurs for the first time after the initial start-up, since there is only the first time optical phase control value in the history of control values, the CPU 60 reads out this value to determine as the current optical phase control value, and outputs this optical phase control value to the temperature controller 51*f*. After the optical phase control setting, the CPU 60 judges whether or not to lock the clock recovery circuit 54, and if not locked, searches for the signal communication point where the value goes up or down from the first time optical phase control value. On the other hand, in the case where this is locked, the CPU 60 determines this as signal communication, and stores the current optical phase control value output at this judgment time in the memory 61, as the second time optical phase control value.

Thereafter, the CPU 60 refers to the history of control values stored in the memory 61 at each time of recovery after signal interruption, and while there is no locking by the clock recovery circuit 54, this is retrospectively referred to in sequence from the latest optical phase control value (optical phase control value stored last time) to the oldest optical phase control value (optical phase control value for the first time). In this case, by starting from the optical phase control value for the time of signal communication at the last time (one time before), there is a high possibility that the optical phase control value is still that for the signal communication point at the current restoration, therefore, this contributes to shortening of the time of the signal communication operation. Furthermore, by having the history proceed retrospectively, then compared to the case of searching for the signal communication point linearly from the initial value as heretofore, the operation time is shortened.

If the clock recovery circuit 54 is locked by the signal communication operation, the CPU 60 stores the optical phase control value output at the time of this locking, in the memory 61 as the latest history. By repeating this, then as shown in FIG. 2, the history of control values having multiple values is stored in the memory 61.

Figure 2:
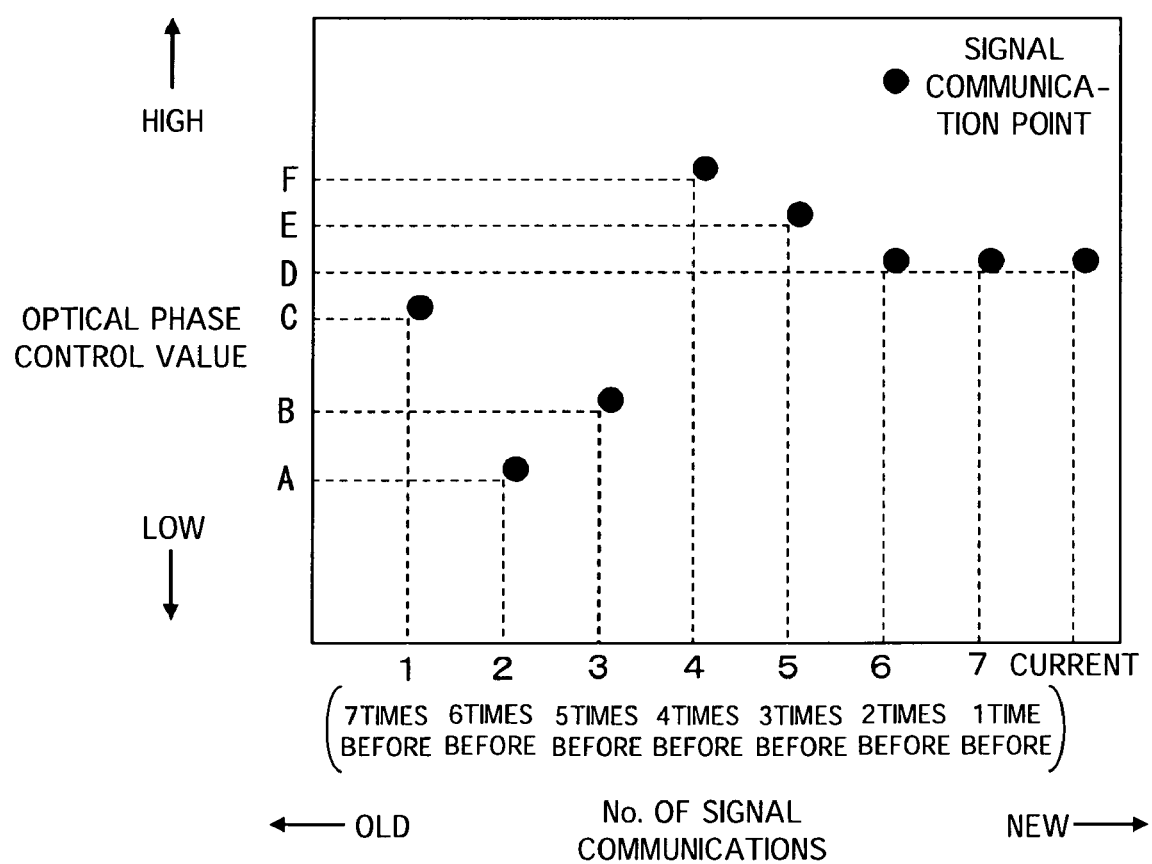
FIG. 2 is a diagram showing an example of a control value history table.

The control by the CPU 60 as described above is an example where the history of control values is referred to retrospectively from the latest value to the oldest value (on the FIG. 2 time line from 1 time before→2 times before . . . →7 times before). Alternatively, a control by which the history of control values stored in the memory 61 is referred to sequentially from the optical phase control value that controls the temperature of the delay interferometers 51*a* and 51*b* to be the lowest. That is to say, in the case of the present embodiment, since temperature control by means of the heaters 51*c* and 51*d* is used, starting from a low temperature is more preferable. Therefore, in the CPU 60 for this case, in FIG. 2, this is referred to in sequence from lowest temperature optical phase control value A (history value of 6 times before)→next candidate B (history value of 5 times before)→C (history value of 7 times before)→D (history value of 2 times before and 1 time before)→E (history value of 3 times before)→F (history value of 4 times before).

Figure 3:
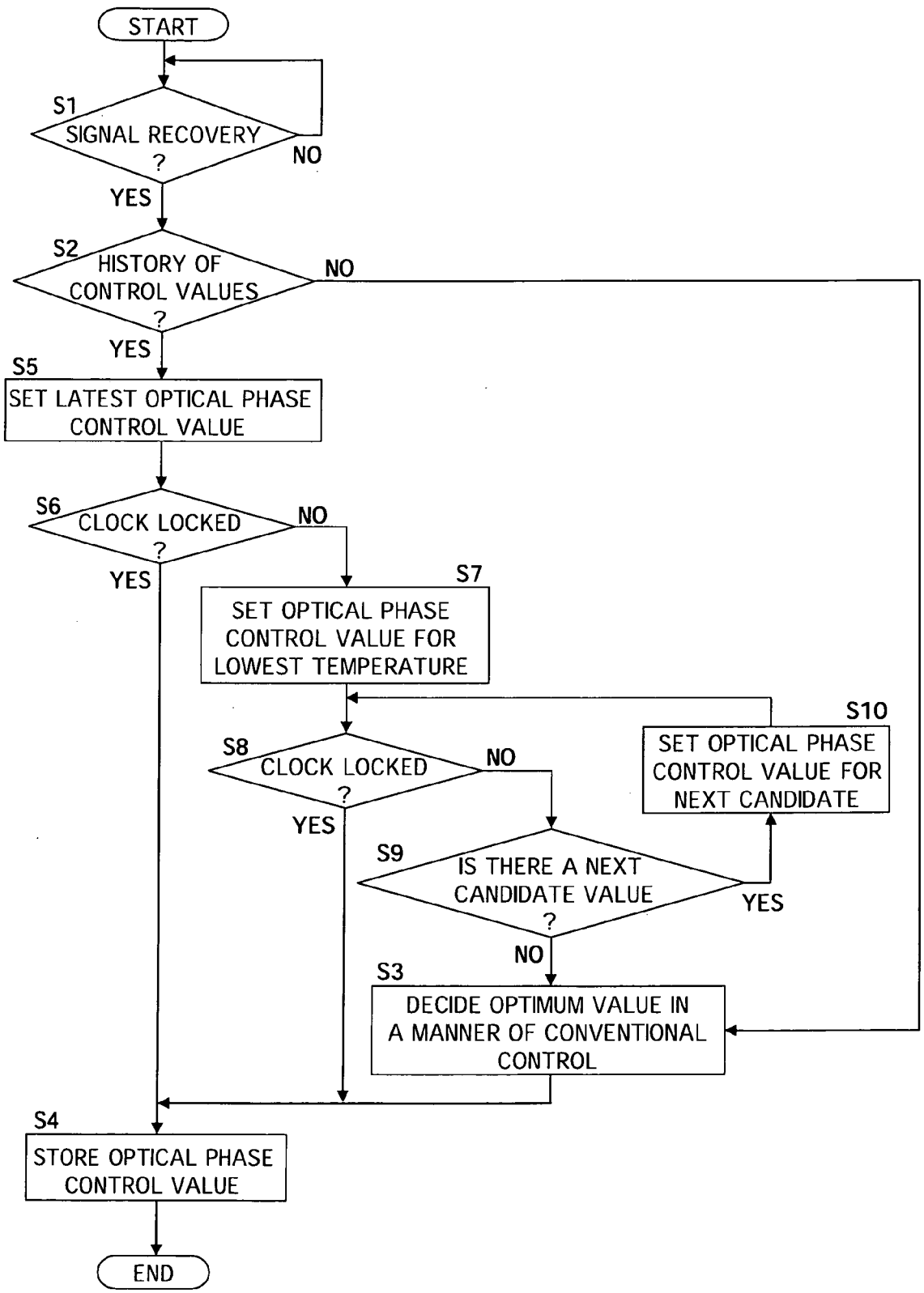
FIG. 3 is a flow chart illustrating an example of an optical phase control method.

Alternatively, a control is also possible in which the CPU 60 refers to the latest (1 time before on time line of FIG. 2) optical phase control included in the history of control values stored in the memory 61, and then refers to sequentially from the optical phase control value (optical phase control value A of FIG. 2) that controls to give the lowest temperature of the delay interferometer. That is to say, there is a high possibility that the optical phase control value for 1 time before is still that for the signal communication point at the current restoration, therefore, at first initially this 1 time before optical phase control value is referred. Continuously, the history of control values is referred to in sequence from the optical phase control value for low temperature. A flow chart concerning this control is illustrated in FIG. 3.

The CPU 60, when signal input to the balanced optical detecting section 52 is confirmed (S1), confirms whether or not a history of control values is stored in the memory 61 (S2). If there is no history of control values, the CPU 60 executes a signal communication point search from the initial value as shown in FIG. 11 (S3). Then, when signal communication is judged from the locking of the clock recovery circuit 54, the CPU 60 stores the optical phase control value output at this signal communication time in the memory 61 as the latest history value (S4).

On the other hand, in step S2, if the history of control values is stored in the memory 61, the CPU 60 reads out the latest optical phase control value included in the history of control values, and outputs this value to the temperature controller 51*f*. Then, the CPU 60 judges whether or not the clock recovery circuit 54 has locked (S6). If this is clock locked, the CPU 60 stores the optical phase control value currently being output, in the memory 61 as the latest history value (S4). If this is not clock locked, the CPU 60 reads out the optical phase control value that controls the temperature of the delay interferometers 51*a* and the 51*b* to be the lowest, from the history of control values stored in the memory 61, and outputs this value (S7).

After step S7, the CPU 60 judges whether or not the clock recovery circuit 54 is locked (S8). If this is clock locked, the CPU 60 stores the optical phase control value currently being output, in the memory 61 as the latest history value (S4). If this is not clock locked, the CPU 60 refers to the history of control values and confirms whether or not there is an optical phase control value of the next candidate (S9). If there is, the CPU 60 reads out from the memory 61, the optical phase control value of the next candidate, and outputs this value (S10). Then the CPU 60 judges whether or not the clock recovery circuit 54 is locked (58), and while this is not clock locked, executes the next candidate confirmation and output step S9→S10. In step S9, if there is no next candidate, the CPU 60 executes the signal communication point search from the initial value as shown in FIG. 11 (S3), and when a signal communication is judged from the locking of the clock recovery circuit 54, stores the optical phase control value output at this signal communication time in the memory 61 as the latest history value (S4).

Also other than such control, the CPU 60 may refer to sequentially from the optical phase control value with the most number of storing times included in the history of control values. That is to say, in FIG. 2, the optical phase control value D is stored two times in succession from 1 time before to 2 times before. However the other optical phase control values A, B, C, E, and F are only stored once each. Therefore, the CPU 60 at first refers to the optical phase control value D for the most stored times, and then refers to the optical phase control values A, B, C, E, and F for once, in sequence from for example the lowest temperature candidate. According to this control, there is a high possibility that the optical phase control value with many storage times is the optical communication point. Therefore this contributes to shortening of the time of the signal communication operation.

Figure 4:
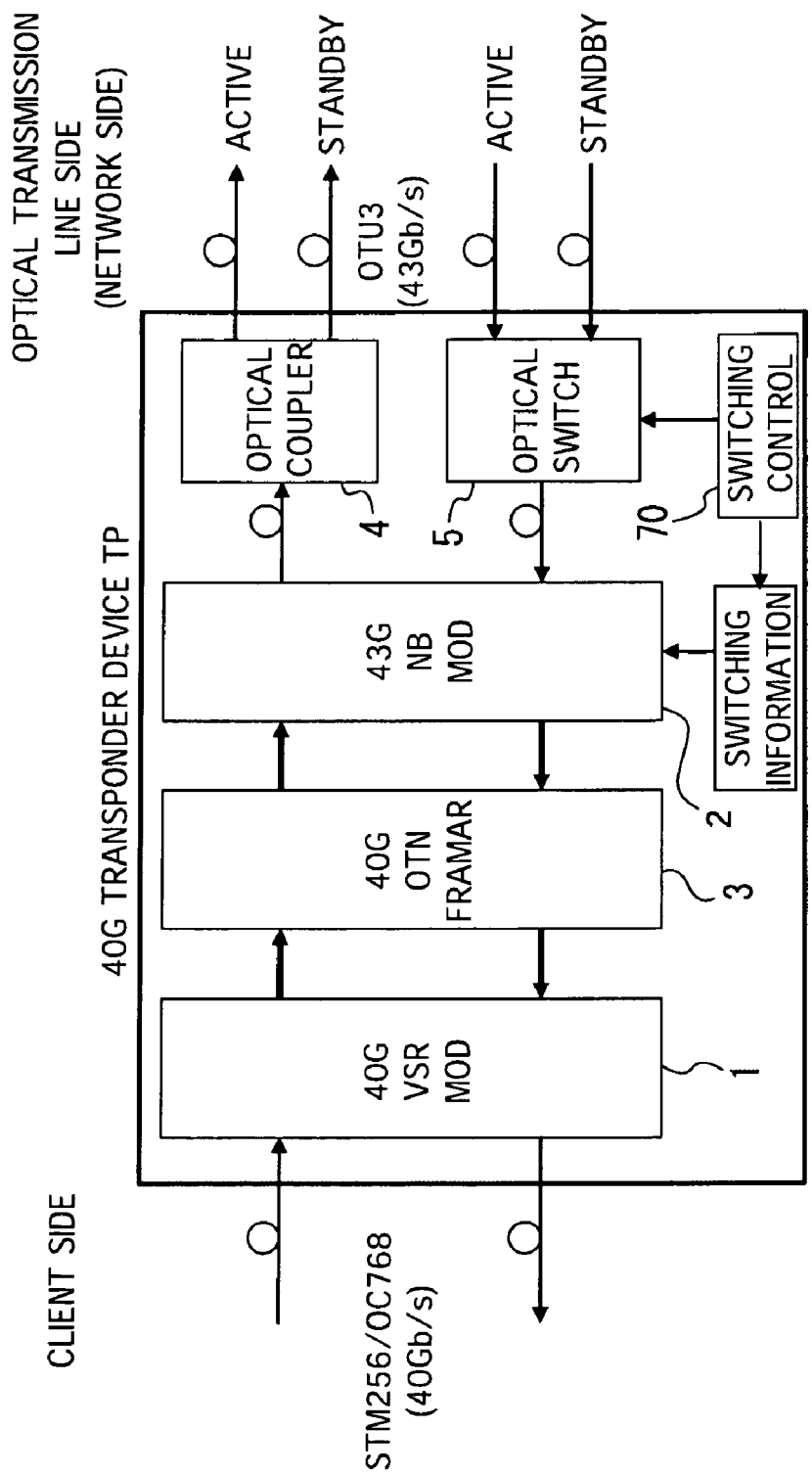
FIG. 4 is a block diagram illustrating an example of a transponder device connected to an optical transmission line provided with a redundant system, that includes the optical receiver shown in FIG. 1.
Figure 8B:
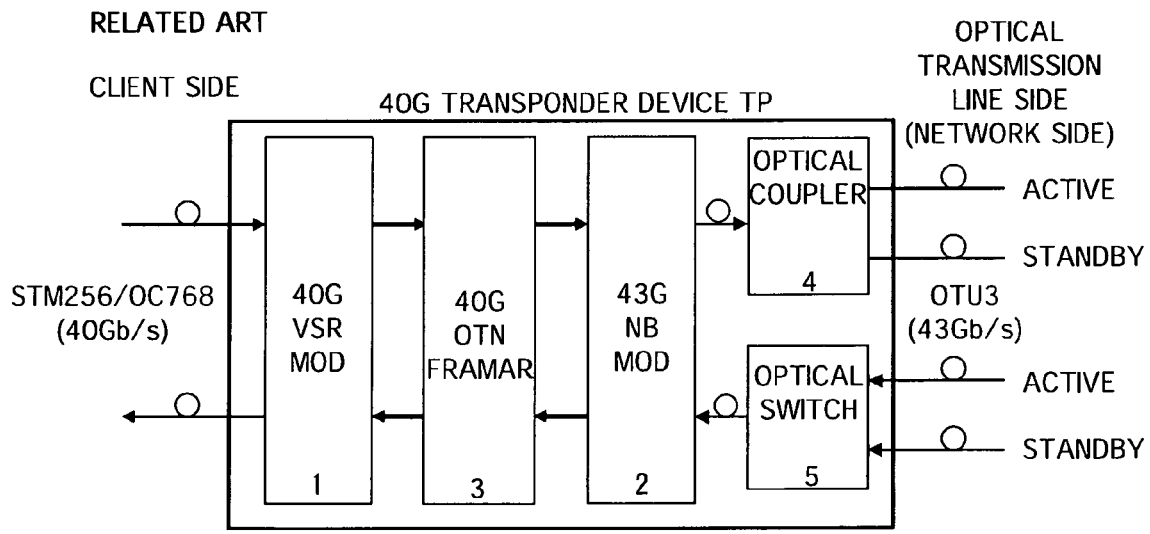
Figure 9:
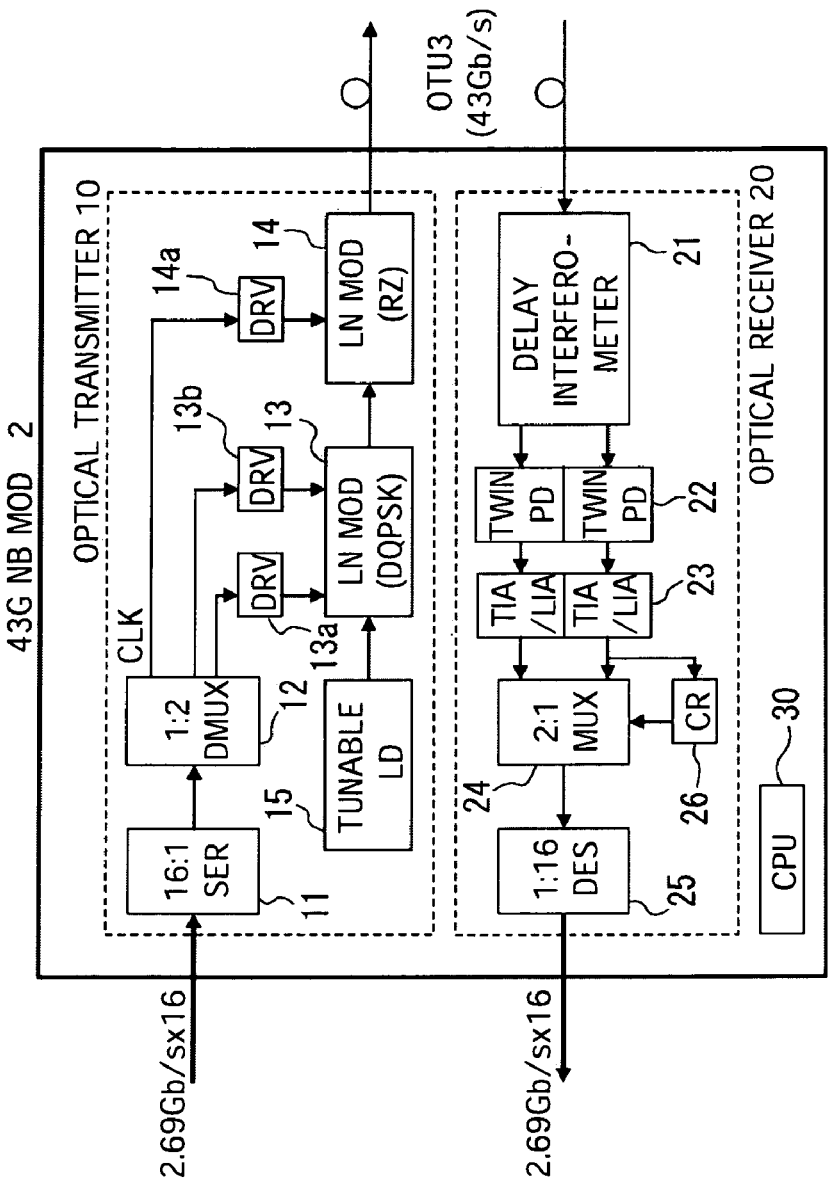
FIG. 9 is a block diagram showing a configuration example of an NB module.
Figure 10:
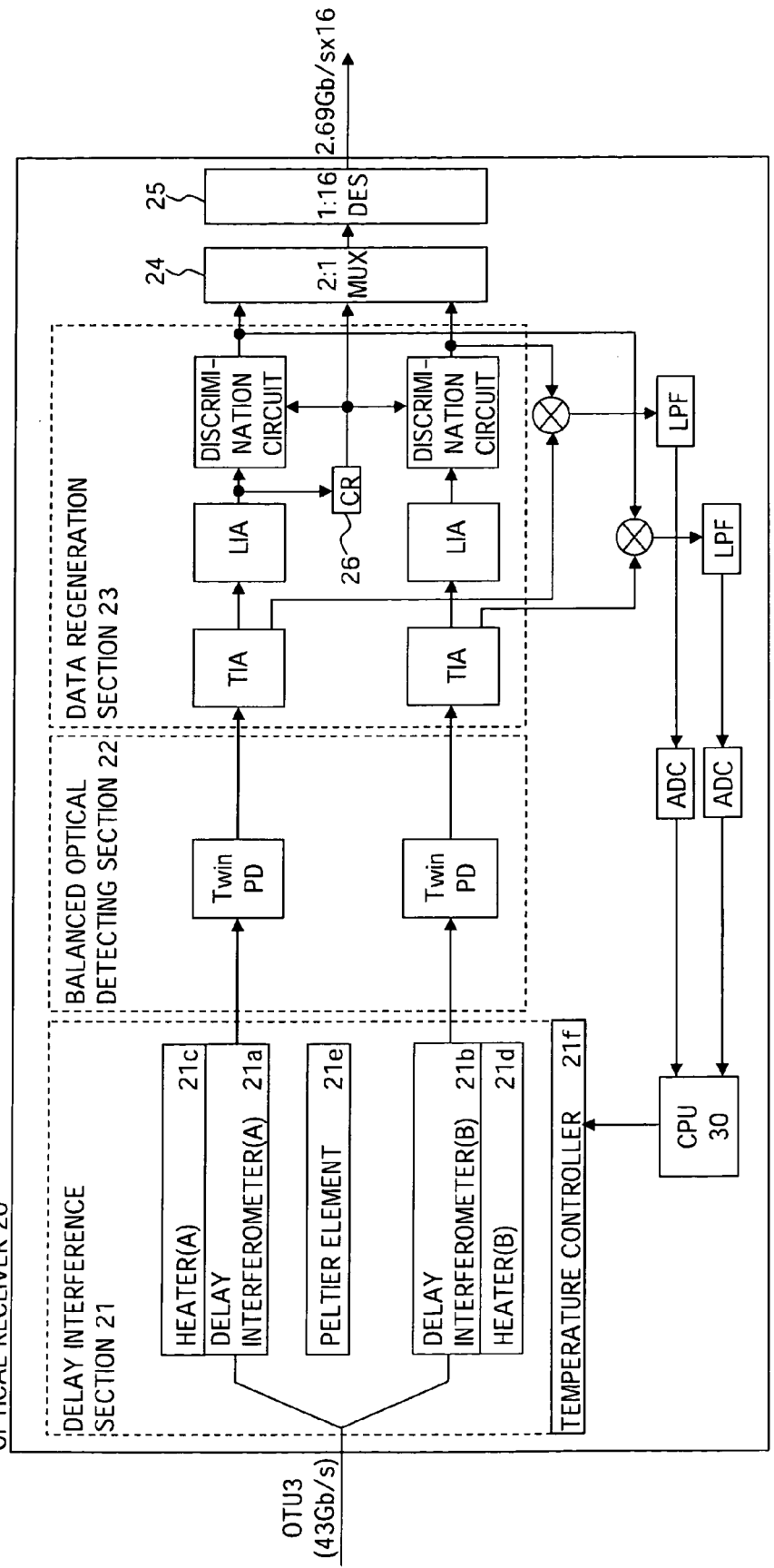
FIG. 10 is a block diagram showing a configuration example of an optical receiver in the NB module shown in FIG. 9.

In FIG. 4, there is shown a configuration example of a case where an optical receiver 50 of the present embodiment is provided in the transponder device TP of FIG. 8(B) that is used in an optical communication system in which a plurality of optical transmission lines are switchably provided as a redundant system. In the above manner, in the transponder device TP for the optical transmission line provided with a redundant system, an optical coupler 4 and an optical switch 5 are provided between an NB module 2 and a plurality of optical transmission lines. The optical coupler 4 branches the OTU 3 signal output from the NB module 2 and sends this to both of the active/standby optical transmission lines. An optical switch 5 selects one of the OTU 3 signals received from the active/standby optical transmission lines, and outputs this selected signal to the NB module 2.

From a switching control section 70 that switches the optical switch 5 to switchingly connect the active/standby optical transmission lines, switching information thereof is transmitted to the CPU 60, and the optical phase control value is determined in accordance with this switching information. In the memory 61 for this case, a separate storage region is provided for the active optical transmission line and the standby optical transmission line, and the table of history of control values as shown in FIG. 2 is separately stored in association with the active and standby optical transmission lines. That is to say, the optical phase control value at the time of signal communication in the signal communication operation that originates when the active optical transmission line is used, is stored in the storage region associated with the active optical transmission line. On the other hand, the optical phase control value at the time of signal communication in the signal communication operation that originates when the standby optical transmission line is used, is stored in the storage region associated with the standby optical transmission line. Therefore the memory 61 stores the history of control values for each of the plurality of optical transmission lines.

The CPU 60, when the optical transmission line is switched from the active to the standby, acquires the switching information from the switching control section 70. Then, the CPU 60 refers to the history of control values stored in the memory 61 in relation to the standby optical transmission line which is switched to be used, and similar to the case at the time of the aforementioned signal interrupt restoration, determines the optical phase control value. Consequently, also when switching the optical transmission line, shortening of the time of the signal communication operation can be realized.

The optical phase control method and the optical receiver that executes this method according to the above proposal, saves the optical phase control value at the time of signal communication as the history of control values. Then, in the signal communication operation that communicates the signal in a not yet signal communication state, rather than sequentially verifying the optical phase control value from the initial value as heretofore, the saved history of control values is referred in order to determine the optical phase control value. The history of control values is collection of the optical phase control values at the time of the prior signal communications. Therefore if this value is initially set for the current communication operation, there is a high possibility that even for the current operation, the set optical phase control value is just or close to the suitable value for signal communication. That is to say, compared to the case where this is verified from the initial value, by being able to start the operation from a value close to an appropriate value for the signal communication, the time until signal communication is shortened.

Such a history of control values is not limited to at the time of signal interrupt restoration, and is also useful at the time of optical transmission line switching in the case where a redundant system is provided. That is to say, the history of control values is saved for each of a plurality of optical transmission lines that constitute a redundant system, and when the optical transmission line is switched, the history of control values that is saved for the optical transmission line switched to be used can be referred in order to determine the optical phase control value. As a result, similarly to above, compared to the conventional technology where this is verified from the initial value, the time until signal communication is shortened.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An optical receiver used in an optical communication system, comprising:
   delay interferometers respectively provided in at least two branches that branch a reception signal;
   a phase shift amount control device that controls a phase shift amount of the delay interferometer in accordance with an optical phase control value;
   a balanced optical detecting section that respectively photoelectrically converts respective branch signals output from the delay interferometers;
   a data regenerating section that regenerates transmission data from the photoelectrically converted branch signals that are output from the balanced optical detecting section;
   a control section that outputs the optical phase control value based on a signal of the data regenerating section; and a memory that stores therein the optical phase control value output from the control section at the time of signal communication, as a history of control values, wherein the control section refers to the history of control values during a signal communication operation to determine the optical phase control value.

2. An optical receiver according to claim 1, wherein the control section:

judges that a signal communication is established, when a phase-locked loop of a clock recovery circuit that regenerates a clock contained in the reception signal is locked; and stores the optical phase control value output at the time of judging that the signal communication is established, in the memory.

3. An optical receiver according to claim 1, wherein the control section sequentially refers to the optical phase control values in the history of control values from a latest optical phase control value therein.

4. An optical receiver according to claim 1, wherein the control section sequentially refers to the optical phase control values in the history of control values from a most frequently stored optical phase control value therein.

5. An optical receiver according to claim 1, wherein the delay interferometers have a characteristic where the phase shift amount changes with temperature, and the phase shift amount control device controls a temperature of the delay interferometer in accordance with the optical phase control value.

6. An optical receiver according to claim 5, wherein the control section sequentially refers to the optical phase control values in the history of control values from an optical phase control value therein that controls to give the lowest temperature of the delay interferometer.

7. An optical receiver according to claim 5, wherein the control section firstly refers to the latest optical phase control value in the history of control values, and then sequentially refers to the optical phase control values in the history of control values from the optical phase control value therein that controls to give the lowest temperature of the delay interferometer.

8. An optical receiver used in an optical communication system in which a plurality of optical transmission lines serving as redundant systems are switchably provided, comprising:

delay interferometers respectively provided in at least two branches that branch a reception signal;

a phase shift amount control device that controls a phase shift amount of the delay interferometers in accordance with an optical phase control value;

a balanced optical detecting section that respectively photoelectrically converts respective branch signals output from the delay interferometers;

a data regenerating section that regenerates transmission data from the photoelectrically converted branch signals that are output from the balanced optical detecting section;

a control section that outputs the optical phase control value based on a signal of the data regenerating section; and a memory that stores therein the optical phase control value output from the control section at the time of signal communication, in association with the optical transmission line which is used at the time of the signal communication, as a history of control values for each of the optical transmission lines, wherein the control section refers to the history of control values of the optical transmission line switched to be used, to determine the optical phase control value, during a switching operation of the optical transmission lines.

9. An optical receiver according to claim 8, wherein the control section:

judges that a signal communication is established, when a phase-locked loop of a clock recovery circuit that regenerates a clock contained in the reception signal is locked; and stores the optical phase control value output at the time of judging that the signal communication is established, in the memory.

10. An optical receiver according to claim 8, wherein the control section sequentially refers to the optical phase control values in the history of control values from a latest optical phase control value therein.

11. An optical receiver according to claim 8, wherein the control section sequentially refers to the optical phase control values in the history of control values from a most frequently stored optical phase control value therein.

12. An optical receiver according to claim 8, wherein the delay interferometers have a characteristic where the phase shift amount changes with temperature, and the phase shift amount control device controls a temperature of the delay interferometer in accordance with the optical phase control value.

13. An optical receiver according to claim 12, wherein the control section sequentially refers to the optical phase control values in the history of control values from an optical phase control value therein that controls to give the lowest temperature of the delay interferometer.

14. An optical receiver according to claim 12, wherein the control section firstly refers to the latest optical phase control value in the history of control values, and then sequentially refers to the optical phase control values in the history of control values from the optical phase control value therein that controls to give the lowest temperature of the delay interferometer.

15. An optical phase control method performed in an optical receiver that branches a signal received from an optical transmission line into at least two branches, and changes a phase shift amount of a delay interferometer provided in each branch, to thereby perform optical phase adjustment of each branched signal, the optical phase control method comprising:

storing an optical phase control value for changing the phase shift amount of the delay interferometer in each case of signal communication, as a history of control values; and determining the optical phase control value with reference to the history of control values during a signal communication operation.

16. An optical phase control method according to claim 15, wherein at determining the optical phase control value, the optical phase control values in the history of control values are referred in sequence from a latest optical phase control value therein.

17. An optical phase control method according to claim 15, wherein at determining the optical phase control value, the optical phase control values in the history of control values are referred in sequence from a most frequently stored optical phase control value therein.

18. An optical phase control method according to claim 15, wherein
in a case where the delay interferometers have a characteristic where the phase shift amount changes with temperature, the optical phase control values in the history of control values are referred in sequence from an optical phase control value therein that controls to give the lowest temperature of the delay interferometer.

19. An optical phase control method according to claim 15, wherein
in a case where the delay interferometers have a characteristic where the phase shift amount changes with temperature, a latest optical phase control value in the history of control values is firstly referred, and then the optical phase control values in the history of control values are referred in sequence from an optical phase control value therein that controls to give the lowest temperature of the delay interferometer.

20. An optical phase control method performed in an optical receiver that branches a signal that is transmitted through any of a plurality of optical transmission lines provided as redundant systems, into at least two branches, and changes a phase shift amount of an interferometer provided in each branch, to thereby perform optical phase adjustment of each branch signal,
the optical phase control method comprising:
storing an optical phase control value for changing the phase shift amount of the delay interferometer in each case of signal communication, regarding each of the plurality of optical transmission lines, as a history of control values for each of the optical transmission lines; and
determining the optical phase control value with reference to the history of control values of the optical transmission line switched to be used, during a switching operation of the optical transmission lines.

21. An optical phase control method according to claim 20, wherein
at determining the optical phase control value, the optical phase control values in the history of control values are referred in sequence from a latest optical phase control value therein.

22. An optical phase control method according to claim 20, wherein
at determining the optical phase control value, the optical phase control values in the history of control values are referred in sequence from a most frequently stored optical phase control value therein.

23. An optical phase control method according to claim 20, wherein
in a case where the delay interferometers have a characteristic where the phase shift amount changes with temperature, the optical phase control values in the history of control values are referred in sequence from an optical phase control value therein that controls to give the lowest temperature of the delay interferometer.

24. An optical phase control method according to claim 20, wherein
in a case where the delay interferometers have a characteristic where the phase shift amount changes with temperature, a latest optical phase control value in the history of control values is firstly referred, and then the optical phase control values in the history of control values are referred in sequence from an optical phase control value therein that controls to give the lowest temperature of the delay interferometer.

* * * * *